May 24, 1960    M. MANDEL    2,938,205
AERIAL NAVIGATION SYSTEM
Filed Nov. 7, 1958    2 Sheets-Sheet 1
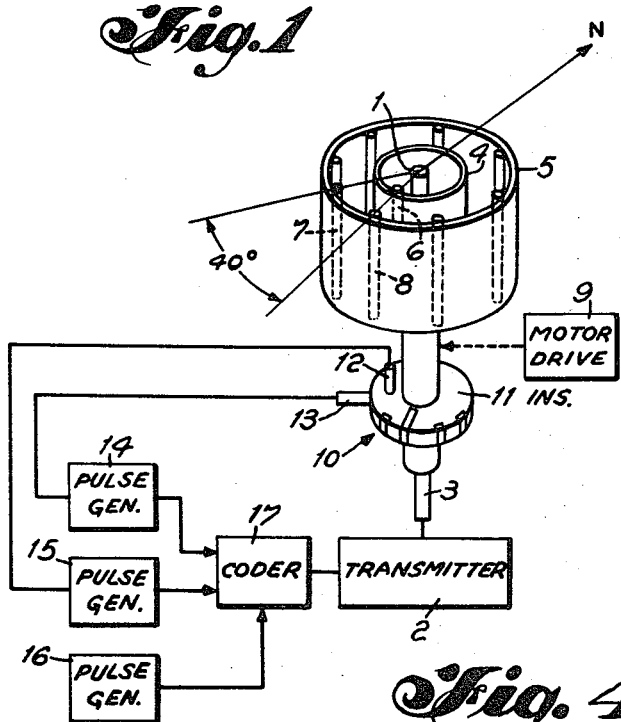
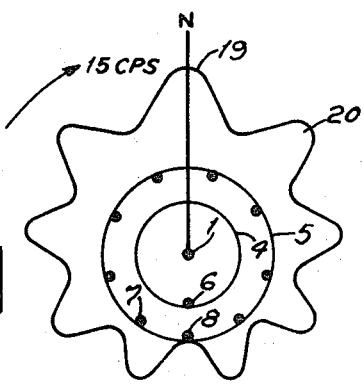
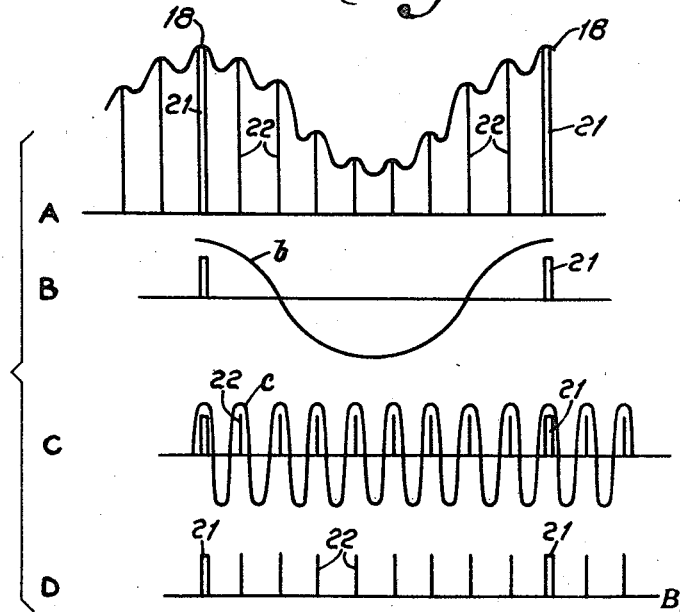
Inventor
MARK MANDEL
By Philip M. Bolton
Attorney

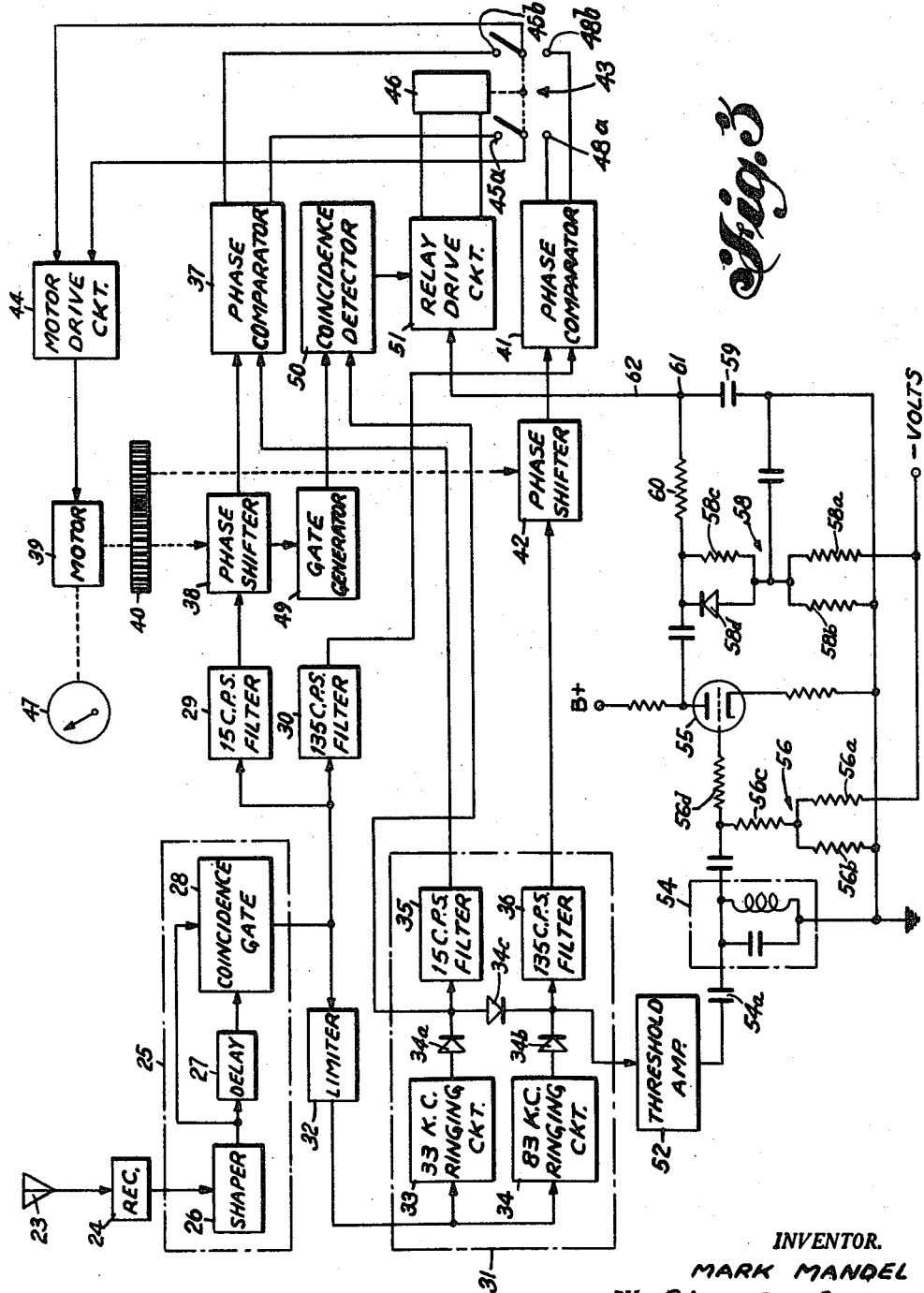

United States Patent Office 2,938,205
Patented May 24, 1960

2,938,205

AERIAL NAVIGATION SYSTEM

Mark Mandel, Bloomfield, N.J., assignor to International Telephone and Telegraph Corporation, Nutley, N.J., a corporation of Maryland Filed Nov. 7, 1958, Ser. No. 772,479

8 Claims. (Cl. 343—106)

This invention relates generally to navigation systems providing azimuthal information and more particularly to such systems employing a beacon transmitting according to a rotating radiation pattern, such as in the systems commonly referred to as Tacan and Vortac.

In certain aerial navigation systems such as Tacan, azimuthal information is given by the relative phase between reference signals and directional signals produced by rotation of a multilobed antenna pattern. Such a Tacan system including beacon and airborne receiver is shown and described in volume 33, March 1956 edition of "Electrical Communication" the technical journal of the International Telephone and Telegraph Corporation and associate companies. In such a Tacan system the beacon antenna is fed pulses of radio frequency which are detected by the airborne receiver, recoded and fed to bearing determining circuits. The antenna of the beacon produces a multilobed directional pattern rotating at 15 cycles per second; thus, to the airborne receiver, the rotation of the antenna pattern produces an amplitude modulated envelope of these pulses. When the major lobe of the beacon antenna pattern points in a given direction, such as for example north, a special combination of pulses forming a short burst is transmitted from the beacon and this short burst is called the "main reference signal." Consequently, by comparing the phase of the major or fundamental modulation envelope, due to the rotation of the beacon antenna pattern, with the main reference signal, a coarse indication of the bearing of the airborne receiver with respect to the beacon is obtained.

In order to obtain a finer indication of bearing, the beacon antenna pattern is multilobed, the multilobes being separated by, for example 40 degrees and the beacon transmits other bursts of pulses called "auxiliary reference pulse signals," these auxiliary pulses being emitted each time one of the multilobes passes the given direction (for example north) as the antenna pattern is rotated. In the present Tacan system the major lobe is rotated at 15 cycles per second and since each one of the multilobes which forms the major lobes are separated by 40 degrees, there are nine such lobes. Consequently, the rotation of the antenna pattern produces a ninth harmonic modulation envelope of 135 cycles per second (9×15 cycles per second) on top of the fundamental 15 cycle per second modulation due to the major lobe.

As previously mentioned the received Tacan signal, as employed up to now, is composed of four components. These components are the fundamental 15 cycle per second modulation, the harmonic 135 cycle per second modulation, a main reference pulse signal and an auxiliary reference pulse signal. The 15 and 135 cycle per second modulations form a complex wave which is used to amplitude modulate the combined main and auxiliary reference pulse signals and other pulses falling therebetween. The main reference pulse signal is composed of 24 pulses and is repeated at a frequency of 15 cycles per second. This group of 24 pulses which form a single main reference pulse signal consists of 12 pairs of pulses each pair separated by 30 microseconds from the next pair and each pulse in a pair separated 12 microseconds and the group is in phase with a predetermined position of the rotating beacon (for example north). Each auxiliary reference pulse signal consists of six pairs of pulses each pair separated 12 microseconds and each pulse of a pair separated 12 microseconds. In other words, each auxiliary reference pulse signal consists of 12 pulses 12 microseconds apart. In operation, the bearing circuits of the airborne equipment separate the four components and convert the main reference pulse signals into a 15 cycle sine wave and the auxiliary reference pulse signals into a 135 cycle sine wave. The sine waves resulting from such conversions are then phase compared with their associated 15 cycle or 135 cycle modulating components and if the 15 cycle modulating component does not bear a predetermined phase relationship with the 15 cycle sine wave obtained by converting the main reference pulse signal, a servo motor is energized which drives a phase shifter for shifting the 15 cycle modulating component until the predetermined phase relationship is achieved. Upon obtaining such phase agreement, switching means are energized causing the output of another phase comparing means for comparing the 135 cycle modulating component with the 135 cycle sine wave to be fed to the motor which also drives a phase shifter for shifting the 135 cycle modulating component until another predetermined phase relationship is obtained. Thus, the motor drive position is indicative of bearing from the airborne equipment to the Tacan beacon and produces a coarse bearing indication in driving the 15 c.p.s. phase shifter and a fine bearing indication in driving the 135 c.p.s. phase shifter to bring the 15 and 135 cycle modulating components into predetermined phase agreements with the 15 and 135 cycle sine waves.

In the past the bearing circuits of the Tacan airborne equipment have operated to first achieve a coarse bearing indication by phase comparing the 15 cycle modulating component with the 15 cycle sine wave and then upon the energization of switching means, to achieve a fine bearing indication by phase comparing the 135 cycle modulating component with the 135 cycle sine wave. In some instances, the auxiliary reference pulse signals are defective in that some of these pulses are missing weak or distorted. However, at the same time the main reference pulse signals may be quite complete. In any event, there will be a switch-over from the 15 cycle mode of operation to the 135 cycle mode of operation as the system endeavors to produce a fine bearing indication. However, since some of the auxiliary reference pulse signals will be missing, the amplitude of the 135 cycle sine wave will vary every few cycles and upon phase comparison with the 135 cycle modulation component an improper phase difference signal for driving the servo motor will result.

It is an object of this invention to provide an improved aerial navigation system wherein faulty signals from which are derived a fine bearing indication will be rejected in favor of coarse bearing indication operation.

It is another object to provide means for detecting that a predetermined portion of the reference pulse signals from which the fine bearing indication is derived are missing or otherwise distorted.

It is another object to employ said detection means to cause coarse bearing information to be indicated rather than fine bearing information.

It is a feature of this invention to detect auxiliary reference pulse signals from the bearing circuits of the Tacan airborne equipment with a signal threshold detector producing an output only when each auxiliary reference pulse signal consists of at least a predetermined number of pulses and to employ the output of said threshold detector to yield a signal whose magnitude dictates whether coarse or fine bearing will be indicated.

It is another feature to filter the output of said threshold detector by a filter tuned to 135 c.p.s. and feed the resulting signal to the input of an amplifier biased to cut-off the output of said amplifier serving to control switching means for switching from a coarse bearing indication to a fine bearing indication and vice versa.

Other and further objects and features of this invention will become more apparent with reference to the following description of embodiments thereof taken in conjunction with the drawings, in which:

Fig. 1 is a pictorial view and block diagram of a Tacan type beacon antenna and transmitter;

Fig. 2 is a plan view of said antenna showing the radiation pattern emitted therefrom;

Fig. 3 is a block diagram and electrical schematic of the Tacan airborne receiver and associated bearing circuits with means for detecting faulty auxiliary reference pulse signals and providing a coarse and fine indication of bearing from said receiver to the Tacan beacon; and Fig. 4 depicts waveforms from which to better understand the operation of the system shown in Fig. 3.

Referring to Fig. 1, there is shown a Tacan type beacon such as described in considerable mechanical and electrical detail in volume 33, March, 1956 of "Electrical Communication," the technical journal of the International Telephone and Telegraph Corporation and associate companies. The antenna of this beacon consists of a central radiator 1 fed by a transmitter 2 via a coaxial line 3. Surrounding radiator 1 and coaxial with it are two cylinders 4 and 5 of non-conductive material, one having a larger diameter than the other. Cylinder 4 serves to support parasitic radiating element 6 while cylinder 5 serves to support nine other parasitic radiating elements such as elements 7 and 8 which are separated by approximately 40 degrees as shown in the figure. Cylinders 4 and 5 are caused to rotate by motor drive 9 at, preferably 15 revolutions per second. Motor drive 9 also drives a rotatable commutator pick up device 10 which consists of conductive elements fixed to a disk 11 at the same angular positions as the parasitic radiating elements are angularly displaced about the radiating element 1, and conductive brushes 12 and 13 feeding signals to pulse generators 14 and 15, respectively, are provided to detect the passing of the parasitic radiating element 6 of cylinder 4 and the parasitic radiating elements such as 7 and 8 of cylinder 5, of a predetermined direction from the axis of the system (for example the north direction).

In operation, pulses are generated by pulse generator 16 which, may be for example, a free running multivibrator. These pulses generated at about 2700 per second are applied to pulse coder 17 which changes each single pulse into a pair of pulses spaced 12 microseconds apart. The pulses from coder 17 are used to key or modulate the RF oscillator of transmitter 2 and the RF pulses from transmitter 2 are fed, via coaxial line 3, to radiator 1 of the antenna system already described. The rotation of the antenna cylinders 4 and 5 having parasitic radiating elements in effect, produces an amplitude modulation envelope on the pulses, such as shown by waveform A of Fig. 4. This modulation envelope has a maximum amplitude peak 18 corresponding to the maximum lobe 19 of the radiation pattern 20, shown in Fig. 2, and other peaks shown in the radiation pattern and in waveform A correspond to the minor lobes of the radiation pattern. Thus, the multilobed antenna pattern which is rotated at 15 cycles per second produces a modulation of 135 c.p.s. on top of the fundamental 15 c.p.s. modulation.

As the antenna system shown in Fig. 1 rotates causing lobe 19 to pass a given reference direction, such as north, a reference pulse signal is emitted herein called the main or north reference pulse signal shown as pulse 21 in waveform A. As each minor lobe passes the reference or north direction, remembering the minor lobes are spaced 40 degrees apart, an auxiliary reference pulse signal represented by pulses 22 in waveform A is emitted. These main or north reference pulse signals and auxiliary reference pulse signals are also shown as clipped pulses in waveforms B, C and D of Fig. 4. The main or north reference pulse signal 21 is initiated by pulse generator 15 which is coupled to timer 10 and the auxiliary reference pulse signals such as pulse 22 of waveform A are initiated by pulse generator 14 also coupled to timer 10, both pulse generators 14 and 15 feeding signals to coder 17. The details of coder 17 are shown in the block diagram on page 30 of the referenced edition of "Electrical Communication." Consequently, by the action of coder 17 and transmitter 2 the radiating element 1 of the beacon antenna is pulsed by pairs of pulses, 12 microseconds between pulses in a pair, at a rate of 2700 pairs of pulses per second except during the intervals when the main and auxiliary reference pulse signals are transmitted. During the interval of the main reference pulse signal, through the action of pulse generator 15 and coder 17, twelve pulse pairs which form a main reference pulse signal are transmitted at the rate of 33000 pulse pairs per second. During the auxiliary reference pulse signal interval, through the action of pulse generator 14 and coder 17 six pairs of pulses are transmitted with 12 microseconds between pairs and 12 microseconds between pulses in each pair effectively yielding a rate of 83000 pulses per second.

Turning next to Fig. 3 there is shown the Tacan airborne equipment comprising an antenna 23 feeding a receiver 24 whose output is coupled to decoder 25. The purpose of decoder 25 is to detect the pulse pairs transmitted by the Tacan beacon and serving to reject other pulses and signals. The decoder 25 might, for example, consist of a shaping circuit 26 which is fed detected pulses from receiver 24, said shaping circuit serving to sharpen these detected pulses by, for example, differentiating them, a 12 microsecond delay circuit 27 coupled to the output of shaping circuit 26 and a coincidence gate 28 coupled to the output of delay circuit 27 and shaping circuit 26, serving to detect only positive pulses which are preceded 12 microseconds by another positive pulse and, thus, serving to detect the above-mentioned pulse pairs. Since the pulse pairs are modulated at 15 and 135 cycles per second, the output of decoder 25 is fed to 15 c.p.s. filter 29 and 135 c.p.s. filter 30. These filters serving to detect the 15 cycle and the 135 cycle modulating waveforms, respectively, and these waveforms are shown in waveforms B and C of Fig. 4 as b and c respectively. In order to detect the main reference pulse signals and the auxiliary reference pulse signals and transform the former into a 15 c.p.s. sine wave and the latter into a 135 c.p.s. sine wave, each sine wave being in phase with their respective pulses, network 31 is provided, coupled to the output of decoder 25 via limiter circuit 32. Limiter circuit 32 merely serves to clip all pulses bringing them to the same amplitude level. Network 31 might, for example, consist of ringing circuits 33 and 34; ringing circuit 33 being tuned to ring at a frequency characterized by the pulse pair separation of the pulses of the pulse pairs forming the main reference pulse signal and ringing circuit 34 being tuned to ring at a frequency characterized by the pulse pair separation of the pulses forming the auxiliary reference pulse signals. For example, ringing circuit 33 might be tuned to ring at 33 kc. and ringing circuit 34 might be tuned to ring at 83 kc. The output of ringing circuits 33 and 34 are diode coupled by diodes 34a and 34b to 15 c.p.s. filter 35 and 135 c.p.s. filter 36, respectively. The inputs to filter 35 is coupled to the input to filter 36 by a diode 34c directed toward filter 36 so that main reference pulse signals are fed to filter 36 as well as auxiliary reference pulse signals, forming a continuous input of pulses at a rate of 135 per second such as shown in waveform D of Fig. 4. These filters serve to detect sine waves in phase with their associated reference pulse signals. The 15 c.p.s. sine wave from filter 35 is fed to phase comparator circuit 37 and the phase shifted modulating waveform output from 15 c.p.s. filter 29 is also fed to phase comparator 37; the shift in phase being accomplished by phase shifter 38 driven by motor 39 via gear train 40. Meanwhile, the sine wave output from 135 c.p.s. filter 36 is fed to phase comparator circuit 41 via phase shifter 42 and the ninth harmonic modulating waveform from 135 c.p.s. filter 30 is also fed to circuit 41. Thus, phase comparator circuit 37 serves to phase compare the fundamental 15 cycle modulating waveform signal with the main reference pulse signals and phase comparator 41 serves to phase compare the ninth harmonic or 135 cycle modulating waveform signal with the auxiliary reference pulse signals.

The output of phase comparator circuits 37 and 41 are each fed via double pole double throw switch 43 to motor drive circuit 44 which in turn energizes the motor 39 which drives phase shifters 38 and 42. When switch 43 is thrown to terminals 45a and b by its solenoid 46, bearing indicator 47 coupled by suitable means to the output of motor 39 will be driven to a coarse bearing indication. When switch 43 is thrown to terminals 48a and b the output from phase comparator 41 is applied to motor drive circuit 44 energizing motor 39 to drive phase shifter 42 and bearing indicator 47 to yield a fine bearing indication. In order that the coarse bearing indication be obtained first and then the fine bearing indication, the output of phase shifter 38 is applied to gate pulse generator 49 which produces a gate pulse of 40 degrees duration. Gate pulse generator 49 may be essentially a conventional plate coupled monostable multivibrator and its output fed to coincidence detector 50 as is also the output of 33 kc. ringing circuit 33. Consequently, when a main reference pulse signal from ringing circuit 33 is in coincidence with the 40 degree duration gate signal from gate generator 49, th output from coincidence detector 50 triggers relay drive circuit 51. When it is triggered, relay drive circuit 51 energizes solenoid switch 46 causing the arms of said switch to contact terminals 48a and 48b applying the output of phase comparator circuit 41 to motor drive circuit 44. Relay drive circuit 51 might, for example, consist of a D.C. amplifier with an input filter (integrating) network. The filter will supply a D.C. voltage to the amplifier when there is coincidence of the main reference and 40 degree gate pulse voltages supplied to the input of coincidence detector 50. When there is no coincidence, the relay drive amplifier will be cut off and the solenoid 46 will not be energized. When there is coincidence between the 40 degree gate pulse and the main reference pulse inputs to coincidence detector, solenoid 46 will be energized.

When motor 39 drives phase shifter 38 to null the output from phase comparator circuit 37, the main reference pulse signals and the 15 cycle modulating waveform output from filter 29 are related to each other in a predetermined manner such as shown in waveform B of Fig. 4. Likewise, when the motor 39 drives phase shifter 42 so that the output from phase comparator circuit 41 is nulled, the auxiliary reference pulse signals and the 135 cycle modulating waveform are related to each other in a predetermined manner such as shown in waveform C of Fig. 4.

If, for some reason the number of the pulse pairs which form a particular auxiliary reference pulse signal are missing or considerably attenuated, as detected in the output of decoder circuit 25, then the output of ringing circuit 34 will be a relatively weak pulse representing the particular reference pulse. Consequently, the output from 135 c.p.s. filter 36 will not be a sine wave of constant amplitude waves and, upon phase comparing this output with the output from filter 30 in phase comparator circuit 41, an erroneous result will be produced and the fine bearing indication will be unreliable. In order to remedy this situation, the occurrence of faulty or missing auxiliary reference pulse signals is detected and the system is switched back to coarse bearing indication even though the main reference pulse signals are in coincidence with the 40 degree gate pulse from gate generator 49. For this purpose the output of ringing circuit 34 consisting of bursts of 83 kc. signal each burst representing an auxiliary reference pulse signal, is applied to threshold amplifier 52. During normal operation amplifier 52 conducts during the interval of each auxiliary and main reference pulse signal when the outputs from ringing circuits 33 and 34 reach a predetermined level. In other words amplifier 52 conducts when a predetermined number of cycles 33 or 83 kc. signal have occurred during each interval. This predetermined number of cycles of 33 or 83 kc. signal is chosen in consideration of the requirements and operation of phase comparator circuit 41. The output of threshold amplifier 52 each time it conducts, is a fixed amplitude pulse and is fed to tuned circuit 54 via a capacitance 54a, this tuned circuit being tuned to 135 c.p.s. The output of tuned circuit 54 is fed to the grid of tube 55 via clamping circuit 56 which clamps the A.C. output from tuned circuit 54 to a negative voltage slightly below cut-off voltage of the tube. Clamping circuit 56 comprises a series-connected pair of voltage dividing resistors 56a and 56b connected between the negative voltage source and ground, with their midpoint connected by two isolating resistors 56c and 56d to the grid of tube 55. The signal from the plate of tube 55 is clamped to a negative voltage by clamping circuit 58 and this negatively clamped 135 cycle signal is applied to capacitor 59 via resistor 60, the combination acting to integrate the 135 cycle signal. Clamping circuit 58 comprises a series-connected pair of voltage dividing resistors 58a and 58b connected between the negative voltage source and ground, with their midpoint connected to a parallel arrangement of an isolating resistor 58c and a rectifying diode 58d. The negative clamping voltages resulting from the clamping actions of clamping circuits 56 and 58, and the value of resistor 60 and capacitor 59 are chosen so that upon the occurrence of at least nine complete cycles of 135 cycle signal at the plate of tube 55, said signal having no cycles missing during a complete cycle of the 15 c.p.s. modulation waveform, a voltage will be applied from junction 61 via line 62 to bias relay drive circuit 51 and this biasing voltage will not be sufficiently negative to interfere with the operation of relay drive circuit 51 in response to the output from coincidence detector 50. On the other hand, when a predetermined number of cycles of 135 c.p.s. signal are missing during one cycle of the 15 c.p.s. waveform, the voltage at junction 61 will become sufficiently negative to prevent relay drive circuit 51 from energizing solenoid 46 and terminals 45a and b, coupling the output of phase comparator 37 to motor drive circuit 44 via switch 43, will continue to energize that motor drive circuit and the system will continue to indicate coarse bearing even though there is coincidence between the output of filter 35 and the output of 40 degree gate generator 49.

While there is described above the principles of this invention in connection with specific apparatus it is to be clearly understood that this description is made only by way of example but not as a limitation to the scope of the invention as set forth in the objects thereof and the accompanying claims.

I claim:

1. A system for detecting and representing a deficiency in repeated bursts of pulses, each burst containing pulses at a given rate comprising a ringing circuit responsive to said bursts of pulses and tuned to said given rate, first threshold detecting means coupled to the output of said ringing circuit, filter means coupled to the output of said threshold detecting means and tuned to the repetition rate of said bursts, second threshold detecting means coupled to the output of said filter means and integrating means coupled to said second threshold detecting means producing a signal level indicative of a deficiency in said bursts of pulses.

2. A system for detecting and representing a deficiency in repeated bursts of pulses each burst containing a given number of pulses at a given pulse rate comprising a ringing circuit responsive to said bursts of pulses and tuned to said given rate, first threshold detecting means coupled to the output of said ringing circuit producing a signal representing each burst containing a predetermined minimum number of pulses, filter means coupled to the output of said first threshold detecting means tuned to the repetition rate of said bursts, second threshold detecting means coupled to the output of said filter means, and integrating means coupled to said second threshold detecting means for producing a signal level indicative of a deficiency in said bursts of pulses.

3. A system for producing a signal representing a deficiency in bursts of pulses, said bursts being repeated at regular intervals and each burst containing a given number of pulses at a given pulse rate comprising a ringing circuit responsive to said bursts of pulses tuned to ring at said pulse rate, first threshold detecting means coupled to the output of said ringing circuit responsive to a given signal level from said ringing circuit, filter means coupled to the output of said first threshold detecting means tuned to the repetition rate of said bursts, second threshold detecting means coupled to the output of said filter means, signal clamping means coupled to the output of said second threshold detecting means and integrating means coupled to said clamping means for producing a signal level indicative of a deficiency in said bursts.

4. In a system employing a ringing circuit to detect regularly repeated bursts of pulses, each burst containing a given number of pulses at a given pulse rate, means for producing a signal indicative of a deficiency in said bursts comprising threshold detecting means coupled to the output of said ringing circuit responsive to a given level of signal therefrom, filter means coupled to the output of said threshold detecting means tuned to the repetition rate of said bursts, amplifying means, first signal clamping means coupling the output of said filter means to said amplifying means, signal integrating means and second clamping means coupling the output of said amplifying means to said integrating means whereby the signal level output from said integrating means is indicative of a deficiency in said bursts.

5. A radio navigation receiver for detecting the bearing of said receiver with respect to a beacon emitting coarse and fine directional signals, and coarse and fine reference signals, comprising means for receiving said signals and separating the components thereof, means for comparing said coarse directional and coarse reference signals producing a coarse bearing signal, means for comparing said fine directional and fine reference signals producing a fine bearing signal, bearing indicating means responsive to said coarse and fine bearing signals, switching means coupled to the output of said coarse comparing means and responsive to a predetermined coarse bearing signal for shifting control of said indicating means from said coarse comparing means to said fine comparing means, means coupled to said receiving means and responsive to a deficient fine reference signal for producing a control voltage and means responsive to said control voltage for causing said switching means to maintain said coarse comparing means coupled to said indicator means.

6. A system as in claim 5, in which said means for separating components comprises ringing circuits tuned to detect said reference signals and said means responsive to a deficient fine reference signal for producing a control voltage comprises first threshold detecting means coupled to the output of said ringing circuits, filter means coupled to said first threshold means and tuned to the repetition rate of said reference signals, second threshold detecting means coupled to the output of said filter means and signal integrating means coupled to the output of said second threshold detecting means for producing said control voltage.

7. A system as in claim 5, in which said means for separating components comprises ringing circuits tuned to be responsive to said coarse and fine reference signals, and in which said means responsive to a deficient fine reference signal for producing a control voltage comprises threshold detecting means responsive to a given signal level from said ringing circuits, filter means coupled to the output of said threshold detecting means tuned to the rate of said fine reference signals, amplifying means, first clamping means coupling the output of said filter means to said amplifying means, integrating means and second clamping means coupling the output of said amplifying means to said integrating means for producing said control voltage.

8. A radio navigation receiver for determining the bearing of said receiver with respect to a beacon which produces a complex signal comprising at least fundamental and harmonic waves modulating pulses, some of which are spaced to form main reference pulse signals and others of which are spaced to form auxiliary reference pulse signals, said main and auxiliary reference pulse signals having predetermined repetition frequencies bearing predetermined relationships to said fundamental and harmonic waves, said receiver comprising means for separating the fundamental and harmonic waves from said complex signal, means to translate the pulse energy from said main and auxiliary reference pulse signals into first and second waves respectively, first phase shifting means coupled to said means for separating the fundamental waves, second phase shifting means coupled to said means to translate auxiliary reference pulse signals into second waves, first phase comparing means coupled to the first phase shifter and to said means to translate main pulse signals into first waves, second phase comparing means coupled to said second phase shifter and to said means for separating the harmonic wave, gate generating means coupled to the output of said first phase shifter, coincidence detecting means coupled to the output of said gate generator and responsive to main reference pulse signals from said receiver producing an output indicative of a predetermined coincidence between said fundamental wave and said main reference pulse signals, motor means for driving said first and second phase shifters and for driving a bearing indicator selective switching means responsive to said coincidence detecting means for coupling the output of said first or second phase comparator means to said motor means, said selection being determined by the output of said coincidence detecting means, means coupled to said means to translate auxiliary reference pulse signals for detecting auxiliary reference pulse signals composed of at least a predetermined number of pulses, signal mixing means, filter means coupling said detecting means to said mixing means, means coupling said means to translate main reference pulse signals to said mixing means, integrating means coupled to the output of said mixing means and means coupling the output of said integrating means to said selective switching means to disable said switching means when the output of said integrating means reaches a predetermined level.

No references cited.